(12) United States Patent
Choi et al.

(10) Patent No.: US 11,764,429 B2
(45) Date of Patent: Sep. 19, 2023

(54) SHEATH MATERIAL FOR BATTERY

(71) Applicants: LiBEST INC., Daejeon (KR);
KHVATEC CO., LTD., Gumi-si (KR)

(72) Inventors: Jang Wook Choi, Daejeon (KR); Joo Seong Kim, Daejeon (KR)

(73) Assignees: LiBEST INC., Daejeon (KR);
KHVATEC CO., LTD., Gumi-si (KR)

( * ) Notice: Subject to any disclaimer, the term of this patent is extended or adjusted under 35 U.S.C. 154(b) by 340 days.

(21) Appl. No.: 17/278,140

(22) PCT Filed: Sep. 20, 2018

(86) PCT No.: PCT/KR2018/011161
§ 371 (c)(1),
(2) Date: Mar. 19, 2021

(87) PCT Pub. No.: WO2020/059910
PCT Pub. Date: Mar. 26, 2020

(65) Prior Publication Data
US 2021/0351462 A1    Nov. 11, 2021

(51) Int. Cl.
*H01M 50/121* (2021.01)
*H01M 50/105* (2021.01)
*H01M 10/04* (2006.01)
*H01M 50/102* (2021.01)
*H01M 50/10* (2021.01)

(52) U.S. Cl.
CPC ..... *H01M 50/121* (2021.01); *H01M 10/0468* (2013.01); *H01M 50/10* (2021.01); *H01M 50/102* (2021.01); *H01M 50/105* (2021.01)

(58) Field of Classification Search
CPC ............. H01M 50/121; H01M 50/102; H01M 50/105; H01M 50/10; H01M 10/0468
See application file for complete search history.

(56) References Cited

U.S. PATENT DOCUMENTS

2011/0159328 A1    6/2011   Yeo

FOREIGN PATENT DOCUMENTS

| KR | 10-2015-0014584 A | 2/2015 |
| KR | 10-2015-0039088 A | 4/2015 |
| KR | 10-2015-0096146 A | 8/2015 |
| KR | 10-2016-0050960 A | 5/2016 |
| KR | 10-1924432 B1 | 12/2018 |

OTHER PUBLICATIONS

International Search Report of PCT/KR2018/011161, dated Jun. 13, 2019.

*Primary Examiner* — Jane J Rhee
(74) *Attorney, Agent, or Firm* — HAMRE, SCHUMANN, MUELLER & LARSON, P.C.

(57) ABSTRACT

A battery pouch that is formed to accommodate an electrode assembly, comprising: a first member layer; and a second member layer that is located between the first member layer and the electrode assembly, and contains an elastomer and protrudes toward the electrode assembly at a plurality of locations to be brought into discontinuous contact with the electrode assembly, wherein the second member layer has spaces open to the electrode assembly between the protruding portions. Accordingly, the power output characteristics of the battery can be improved and the damage to the damage to the sealing portion can be prevented.

11 Claims, 10 Drawing Sheets

SHEATH MATERIAL FOR BATTERY

TECHNICAL FIELD

The present disclosure relates to a battery pouch which accommodates an electrode assembly.

BACKGROUND

Various primary or secondary batteries are power supply devices configured to store chemical energy based on a redox potential difference between the negative electrode and the positive electrode, i.e., two electrodes, and convert the chemical energy into electric energy when connected to external conducting wires to enable a desired electronic device to operate. When a battery is driven to be discharged as described above, the electric energy that can be delivered at a given time corresponds to the power output, and the power output is an important index in evaluating the performance of the battery. For example, the acceleration performance of an electric vehicle is determined by the power output performance of a secondary battery installed in the electric vehicle. The power output characteristics of the battery are determined by various properties of components inside the battery. In particular, the internal resistance greatly affects the power output characteristics. Therefore, the selection of materials inside the electrodes, the stack design of the electrode assembly, etc. are important factors in the power output characteristics.

In general, if materials of the two electrodes in a given battery system (lithium-ion battery, lead-acid storage battery, nickel metal hydride battery, etc.) are determined, a change in the internal resistance generated by the electrode active materials is small, and, thus, it is difficult to greatly improve the power output. This is because the internal resistance of the active materials is determined by the crystal structures of the active materials of the two electrodes and the resultant molecular orbitals. Therefore, when the given active materials of the two electrodes are used, the internal resistance is minimized by modifying the structure or stack design of the electrode assembly. This is a way of improving the power output and is more easily adoptable in the actual battery manufacturing process. Moreover, as for a secondary battery capable of being charged and discharged hundreds of times, the volume expansion and contraction of the active materials of the two electrodes are repeated. During this process, various problems of increasing the internal resistance of the battery, such as distortion of the two electrodes or formation of an empty space, occur. In this case, a method of narrowing the distance between the two electrodes of a unit cell by applying a pressure to the battery can significantly reduce the internal resistance inside the electrode assembly, and can be commonly applied to various battery systems regardless of materials of the electrodes.

In order to apply a pressure to the electrode assembly, a method of applying a pressure from the outside after assembly of a battery assembly has been generally considered. However, since it requires additional components inside or outside the battery, such as a pressurizer, there is a limitation in application to an actual battery. Currently, the most easily adoptable method for improving the power output characteristics of a currently commercial battery is to reduce the active material content and increase the carbon conductor content inside the electrodes, which entails a relative decrease in the active material content and thus causes a significant decrease in the energy density of the battery.

DISCLOSURE OF THE INVENTION

Problems to be Solved by the Invention

An object of the present disclosure is to provide a battery pouch that is made to be in discontinuous contact with an electrode assembly accommodated therein and to press the electrode assembly.

Means for Solving the Problems

According to an aspect of the present disclosure, a battery pouch that is formed to accommodate an electrode assembly, comprising: a first member layer; and a second member layer 120 that is located between the first member layer and the electrode assembly, and contains an elastomer and protrudes toward the electrode assembly at a plurality of locations to be brought into discontinuous contact with the electrode assembly, wherein the second member layer has spaces open to the electrode assembly between the protruding portions.

According to an aspect of the present disclosure, the elastomer includes any one or more selected from the group consisting of unsaturated rubbers that can be cured by sulfur vulcanization, saturated rubbers that cannot be cured by sulfur vulcanization, and thermoplastic elastomers.

According to an aspect of the present disclosure, the battery pouch further comprising: a plurality of impressed parts and non-impressed parts processed to be repeatedly impressed, and a sealing portion, wherein an area of the second member layer corresponding to the non-impressed parts is in contact with the electrode assembly.

According to an aspect of the present disclosure, in a repeated pattern of the plurality of impressed parts and non-impressed parts, when the width of the impressed part is defined a, the width of the non-impressed part is defined as b and the height of the impressed part is defined as h, and based on the height of the non-impressed part which is a reference plane, an internal angle of the impressed part is defined as $\theta$, an external angle of the impressed part is defined as $\theta'$, the perimeter of the impressed part is defined as $\alpha_i$ (wherein i is a positive integer), the edge between the impressed part and the non-impressed part is defined as d, the interior center axis of a perpendicular to d is defined as c and the distance between d and c is defined as r, a is more than 0 mm and equal to or less than 20 mm, b is from 0 mm to 5a, h is more than 0 mm and equal to or less than 2a, $\theta$ is more than 0° and equal to or less than 90°, $\theta'$ is equal to or more than 90° and less than 180°, the sum $$\sum_{i=1}^{\infty} a_i$$

(wherein i is a positive integer) of the perimeter of the impressed part is more than a and equal to or less than 5a and r is equal to or more than 0 mm and less than 2h.

According to an aspect of the present disclosure, in a repeated pattern of the plurality of impressed parts and non-impressed parts, when the width of the impressed part is defined a, the width of the non-impressed part is defined as b, the height of the impressed part is defined as h and the sum of the perimeter of the impressed part is defined as (wherein i is a positive integer), and based on the height of the non-impressed part which is the height of a reference plane, the number of edges formed when the impressed part located on the reference plane becomes angular is defined as N, an internal angle of the edge is defined as θ", the edge is defined as d', the interior center axis of a perpendicular to d" is defined as c' and the distance between d' and c' is defined as r', a is more than 0 mm and equal to or less than 20 mm, b is from 0 mm to 5a, h is more than 0 mm and equal to or less than 2a, the sum $$\sum_{i=1}^{\infty} a_i$$

(wherein i is a positive integer) of the perimeter of the impressed part is more than a and equal to or less than 5a, N is equal to or more than 1, θ" is from 90° to 180° and r' is equal to or more than 0 mm and less than 2h.

According to an aspect of the present disclosure, when a pressure inside a battery assembly decreases, the second member layer applies a pressure to the electrode assembly and thus reduces the distance between the electrodes of the elect.

According to an aspect of the present disclosure, a fraction CA-1/CA-2 of a contact angle CA-1 to the electrolyte of the first member layer and a contact angle CA-2 to the electrolyte of the second member layer is more than 0 and less than 1.

According to an aspect of the present disclosure, when the first member layer is compared to the second member layer, the first member layer has relatively high Young's modulus, low water vapor transmission rate, low elongation, and low elastic recovery from elongation.

According to an aspect of the present disclosure, the ratio of Young's modulus of the first member layer and the second member layer is from 1,500,000:1 to 1:1, the ratio of water vapor transmission rate is from 1:1 to 1:100, the ratio of elongation is from 1:1 to 1:2,000, and the ratio of elastic recovery is from 1:1 to 1:1,000.

According to an aspect of the present disclosure, the first member layer has a Young's modulus of from 10,000 kgf cm$^{-2}$ to 3,000,000 kgf cm$^{-2}$, an elongation of from 0.5% to 80%, a elastic recovery from elongation of from 0% to 50%, a contact angle of from 5° to 60° with respect to the electrolyte, and a water vapor transmission rate of from 0 g m$^{-2}$ day$^{-1}$ to 7 g m$^{-2}$ day$^{-1}$ at a thickness of 0.5 mm, and the second member layer has a Young's modulus of from 2 kgf cm$^{-2}$ to 50,000 kgf cm$^{-2}$, an elongation of from 50% to 2,000%, an elastic recovery from elongation of from 50% to 100%, a contact angle of 40° to 150° with respect to the electrolyte, and a water vapor transmission rate of from 1 g m-2 day-1 to 17 g m-2 day-1 at a thickness of 0.5 mm.

According to an aspect of the present disclosure, the decrease in the pressure inside the battery assembly occurs in a vacuum sealing process during assembly of the battery assembly, and the decrease in the pressure inside the battery assembly causes a decrease in the thickness of the electrode assembly in the range of equal to or more than 0.8 t' and less than 1 t', compared to the thickness t' of the electrode assembly before the vacuum sealing process.

Effects of the Invention

A battery pouch according to the present disclosure includes a second member layer containing an elastomer so that the second member layer can be brought into discontinuous contact with an electrode assembly. Accordingly, when an internal pressure decreases in a vacuum sealing process during assembly of a battery, an elastic and discontinuous pressure is additionally applied to the electrode assembly by the second member layer containing the elastomer. Therefore, the power output characteristics of the battery can be significantly improved. Further, a space may be formed between the second member layer containing the elastomer and the electrode assembly by discontinuous contact. Therefore, while the electrode assembly is pressed by the second member layer, it is possible to suppress damage to a sealing portion located at the edge of the battery pouch caused by a pressure applied to the sealing portion.

BEST MODE FOR CARRYING OUT THE INVENTION

Hereinafter, the present disclosure will be described in detail.

The following exemplary embodiments are provided only for understanding of the present disclosure but not intended to limit the right scope of the present disclosure. Therefore, the equivalent inventions that perform the same functions in the same scope as the present disclosure are also included in the right scope of the present disclosure.

It is to be noted that when reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terms such as first, second, A, B, (A), (B), etc. can be used. These terms are used only to differentiate the components from other components. Therefore, the nature, order, sequence, etc. of the corresponding components are not limited by these terms. It is to be understood that when one element is referred to as being "connected to" or "coupled to" another element, it may be directly connected or coupled to another element or be connected or coupled to another element, having still another element "connected" or "coupled" therebetween.

In order to significantly improve the limited power output characteristics of a conventional battery, the present disclosure provides a battery pouch having an elastomer layer that is brought into discontinuous contact with an electrode assembly on an inner surface of a pouch layer containing aluminum or aluminum alloy or stainless steel. In a vacuum sealing process during assembly of a battery, the elastomer layer on the inner surface of the pouch additionally generates an elastic and discontinuous pressure on the electrode assembly due to a decrease in an internal pressure of the battery, and, thus, the power output characteristics can be significantly increased. Further, the discontinuous contact between the elastomer layer and the electrode assembly provides an adequate space inside the battery. Thus, even when the elastomer layer presses the electrode assembly, it is possible to effectively suppress damage to a sealing portion located at the edge of the battery.

For discontinuous contact with the electrode assembly, the pouch layer containing aluminum or aluminum alloy or stainless steel is composed of an impressed part and a non-impressed part through an impressing process, and an elastomer layer inside an area corresponding to the non-impressed part may be brought into contact with this electrode assembly.

The elastomer may include unsaturated rubbers that can be cured by sulfur vulcanization, saturated rubbers that cannot be cured by sulfur vulcanization, and thermoplastic elastomers.

Figure 1:
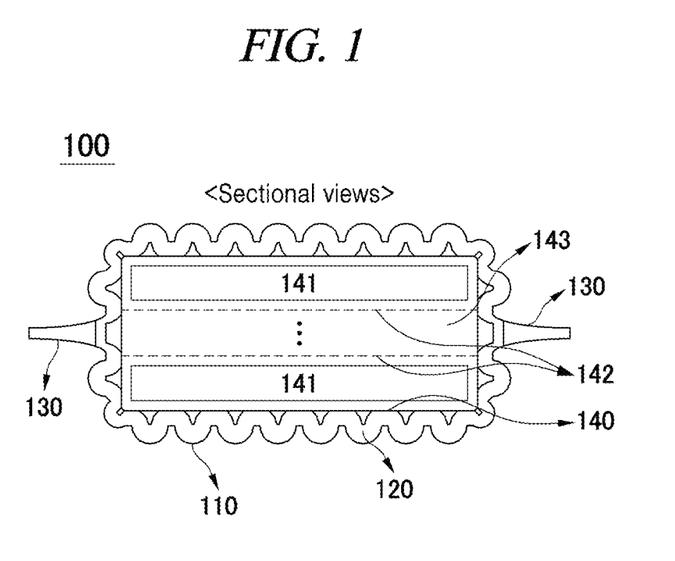
FIG. 1 is a cross-sectional view illustrating a battery assembly in which an electrode assembly 140 equipped with two electrodes 141 including a negative electrode and a positive electrode, a separator 142, and an electrolyte 143 is accommodated in a pouch for a battery including a first member layer 110 including an impressed part and a non-impressed part, a second member layer 120 including therein an elastomer layer that is brought into discontinuous contact with the electrode assembly, and a sealing portion 130 formed by thermally sealing the first member layer 110 in a vacuum sealing process during assembly of a battery.

Referring to FIG. 1, the battery pouch according to an embodiment of the present disclosure may have a structure in which a second member layer 120 made of an elastomer and elastically and discontinuously contacting the electrode assembly is embedded in a first member layer 110 containing aluminum or aluminum alloy or stainless steel in order to improve the power output of the battery. In order to provide a discontinuous contact surface, the first member layer excluding a sealing portion 130 is impressed and includes an impressed part 210 and a non-impressed part 220, and an area corresponding to the non-impressed part can be brought into contact with the electrode assembly.

In the battery pouch according to an embodiment of the present disclosure shown in FIG. 1, the first member layer 110 may contain aluminum or aluminum alloy or stainless steel. The second member layer 120 is an elastomer layer and may contain 1) unsaturated rubbers that can be cured by sulfur vulcanization, 2) saturated rubbers cannot be cured by sulfur vulcanization, and 3) thermoplastic elastomers.

1) The unsaturated rubbers that can be cured by sulfur vulcanization may include natural polyisoprene (cis-1,4-polyisoprene (natural rubber), trans-1,4-polyisoprene (gutta-percha)), polyisoprene rubber (IR), polybutadiene rubber (BR), polychloroprene rubber (CR), neoprene, Baypren etc., poly(isobutylene-co-isoprene) rubber (IIR), chloro IIR (CIIR), bromo IIR (BIIR), poly(styrene-co-butadiene) rubber (SBR), poly(acrylonitrile-co-butadiene) rubber (NBR), hydrogenated NBR (HNBR), Therban, Zetpol and the like.

2) The saturated rubbers cannot be cured by sulfur vulcanization may include epichlorohydrin rubber (ECO), polyacrylic rubber (ACM, ABR), silicone rubber (SI, Q, VMQ), fluorosilicone rubber (FVMQ), polyether block amides (PEBA), chlorosulfonated polyethylene (CSM), Hypalon, ethylene-vinyl acetate (EVA) and the like.

3) The thermoplastic elastomers may include thermoplastic styrenic block copolymers (TPE-s), for example, polystyrene-block-polybutadiene-block-polystyrene (SBS), polystyrene-block-polyisoprene-block-polystyrene (SIS), polystyrene-block-poly(ethylene-ran-propylene)-block-polystyrene (SEPS), polystyrene-block-poly(ethylene-ran-butylene)-block-polystyrene (SEBS) and the like.

The thermoplastic elastomers may also include olefin polymer blends, called thermoplastic polyolefin blends (TPE-o). These polymers are elastomeric alloys obtained by mixing the above-described TPE-s, such as SBS, SIS, SEPS and SEBS, with polyolefin, such as PS, PP and PE. Further, the thermoplastic elastomers may include thermoplastic polyurethanes (TPU), thermoplastic copolyester, thermoplastic polyamides and the like. Finally, thermoplastic vulcanizate elastomers (TPV) include, for example, ethylene propylene monomer (EPM) rubber, ethylene propylene diene monomer (EPDM) rubber, fluroelastomer (FKM, and FEPM), perfluoroelastomers (FFKM) and the like.

The second member layer may be formed on an inner surface of the first member layer by using the first member layer as a substrate, placing a precursor in a molten state of the second member layer on the first member layer and performing cross-linking with heat. Alternatively, the second member layer may be formed on the inner surface of the first member layer through thermal compression after production by separating each layer.

Figure 2A:
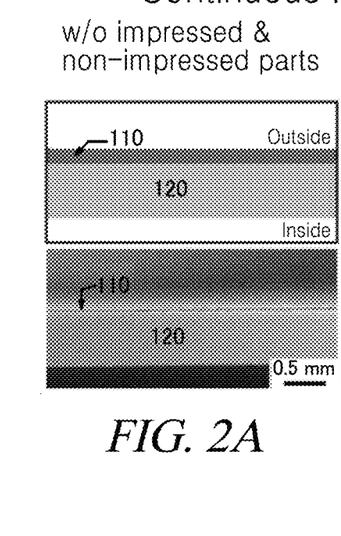
FIGS. 2A-2D are cross-sectional views showing combinations of the presence or absence of an impressed part 210 and a non-impressed part 220 of the first member layer 110 with a continuous or discontinuous contact between the second member layer 120 and the electrode assembly 140 mentioned in the description of FIG. 1.
Figure 2B:
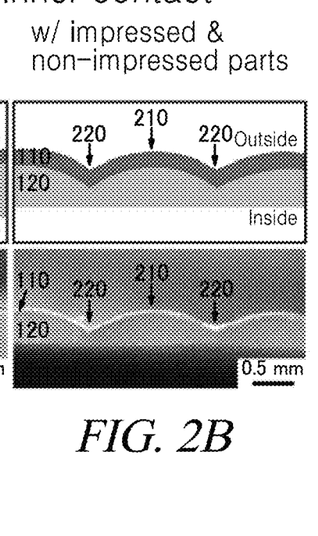
Figure 2C:
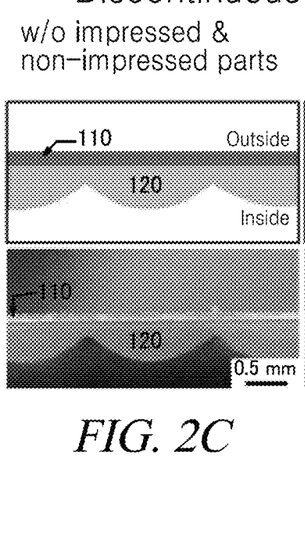
Figure 2D:
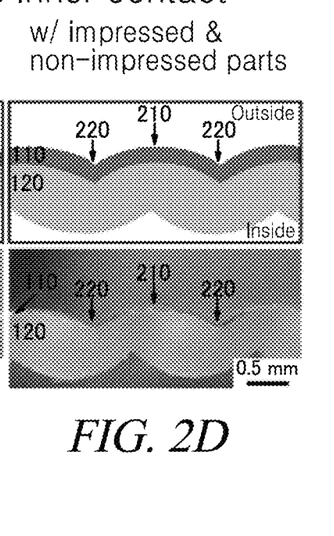

FIGS. 2A-2D are cross-sectional views showing combinations of the presence or absence of the impressed part 210 and the non-impressed part 220 of the first member layer 110 with a continuous or discontinuous contact between the second member layer 120 and the electrode assembly 140 to be included on an inner surface thereof. FIG. 2A shows a case where an impressed part and a non-impressed part are not present in the first member layer, and the second member layer is in continuous contact with the electrode assembly, and FIG. 2B shows a case where an impressed part and a non-impressed part are present in the first member layer, and the second member layer is in continuous contact with the electrode assembly. In addition, FIG. 2C shows a case where an impressed part and a non-impressed part are not present in the first member layer, and the second member layer is in discontinuous contact with the electrode assembly, and FIG. 2D shows a case where an impressed part and a non-impressed part are present in the first member layer, and the second member layer is formed along the impressed pattern of the first member layer to discontinuously contact the electrode assembly.

Figure 3:
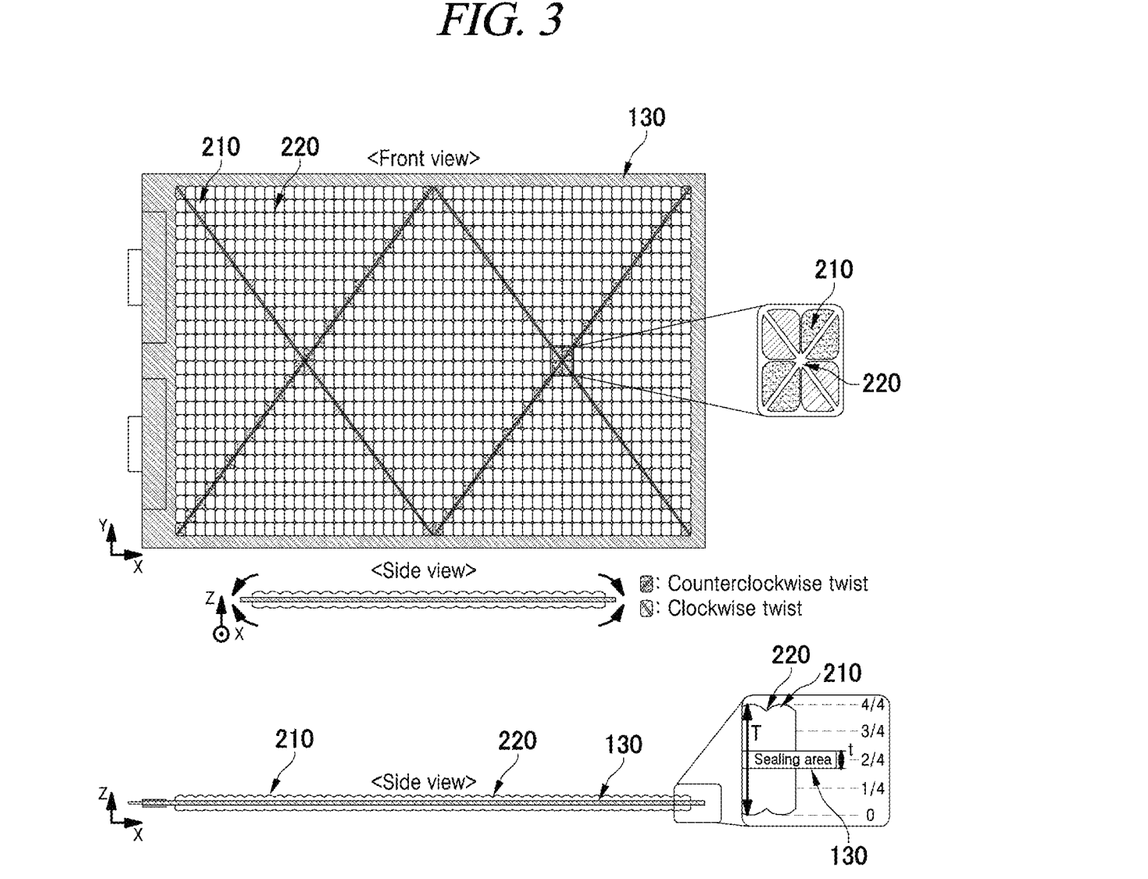
FIG. 3 provides a front view and a side view showing an external appearance of an impressed pattern of the first member layer 110 mentioned in the description of FIG. 1.

As shown in FIG. 3, the impressed part 210 and the non-impressed part 220 are alternately repeated in a predetermined direction, and the repetition direction may be formed in a uniaxial direction, or may be formed in a biaxial direction or a triaxial direction, a tetra-axial direction, . . . , N axial direction at a predetermined angle. Referring to <Side view>, it can be seen that the impressed part 210 and the non-impressed part 220 are processed to be repeatedly impressed with the same thickness in the z-axis (vertical) direction around the sealing portion 130. By press-fitting and bonding, the sealing portion 130 having a thickness t may be located in an area of ¼T to ¾T with respect to the battery assembly having a total thickness T.

Figure 4A:
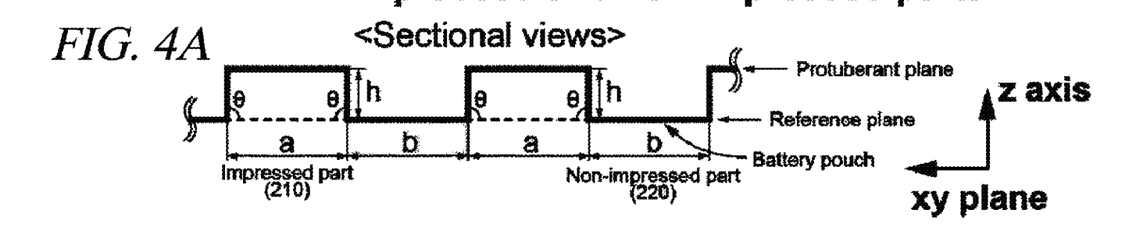
FIGS. 4A-4D are views defining the pattern of the impressed part 210 and the non-impressed part 220 of the battery pouch according to the present disclosure.
Figure 4B:
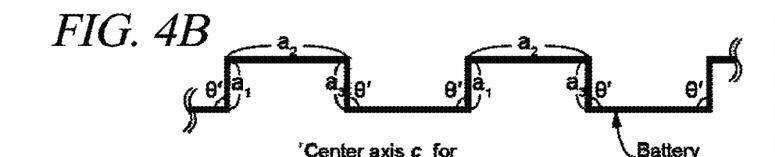
Figure 4C:
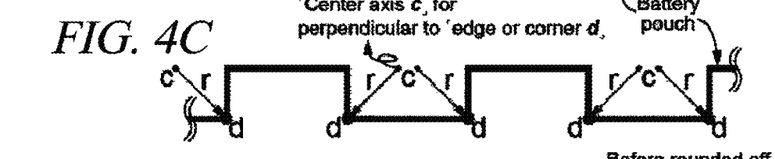

Therefore, it is possible to reduce the risk of damage to the sealing portion 130 caused by a pushing pressure for the second member layer in the xy plane direction when a pressure is applied to the second member layer 120 in the z-axis direction in a vacuum sealing process. FIGS. 4A-4D are views defining a pattern of the impressed part 210 and the non-impressed part 220 of the battery pouch according to the present disclosure. Referring to <Side view> of FIG. 4A, the width of the impressed part 210 of the battery pouch is defined a, the width of the non-impressed part 220 is defined as b, the height of the impressed part is defined as h, and an internal angle of the impressed part based on the reference plane is defined as θ. Here, a, b, h and θ may be 0 mm≤a<20 mm, 0 mm≤b≤5a, 0 mm<h≤2a and 0°<θ≤90°, respectively. Referring to <Side view> of FIG. 4B, an external angle based on the reference plane is defined as θ' and the perimeter of the impressed part is defined as $\alpha_i$. Here, θ' and $\alpha_i$ may be 90°≤θ'<180° and a<

$$\sum_{i=1}^{\infty} a_i \leq 5a$$

Figure 4D:
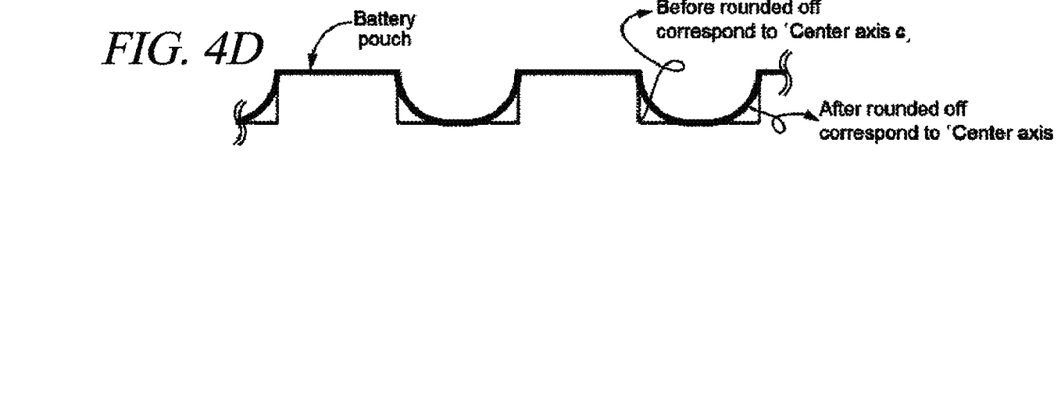

(wherein i is a positive integer). Referring to <Side view> of FIG. 4C, d which is the edge between the impressed part and the non-impressed part, c which is the interior center axis of a perpendicular to d, and r which is the distance between d and c are defined. Here, r may be 0 mm≤r<2h. <Side view> of FIG. 4D shows a thin line representing before the edge is rounded off with respect to a certain distance r and a thick curve representing after the edge is rounded off. FIG. 4D shows an embodiment of the rounding off of the edge between the impressed part and the non-impressed part, and the edge rounding may be performed in part or in whole. However, the present disclosure is not limited to the shape and the distance r shown in the drawing.

Figure 5A:
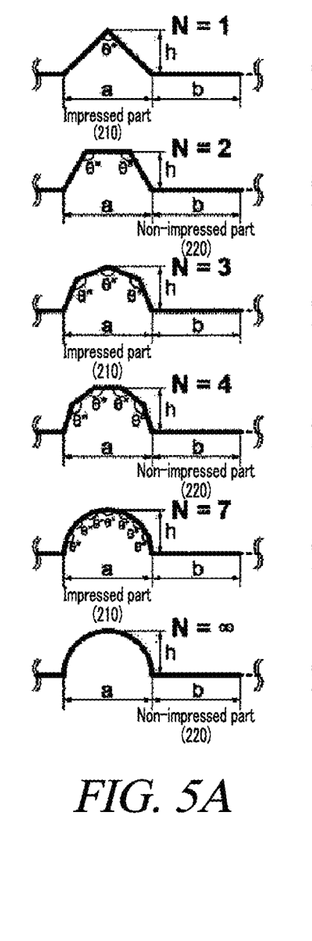
FIGS. 5A-5C are views showing embodiments of the morphology of the pattern of the impressed part 210 and the non-impressed part 220 of the battery pouch according to the present disclosure.
Figures 5B, 5C:
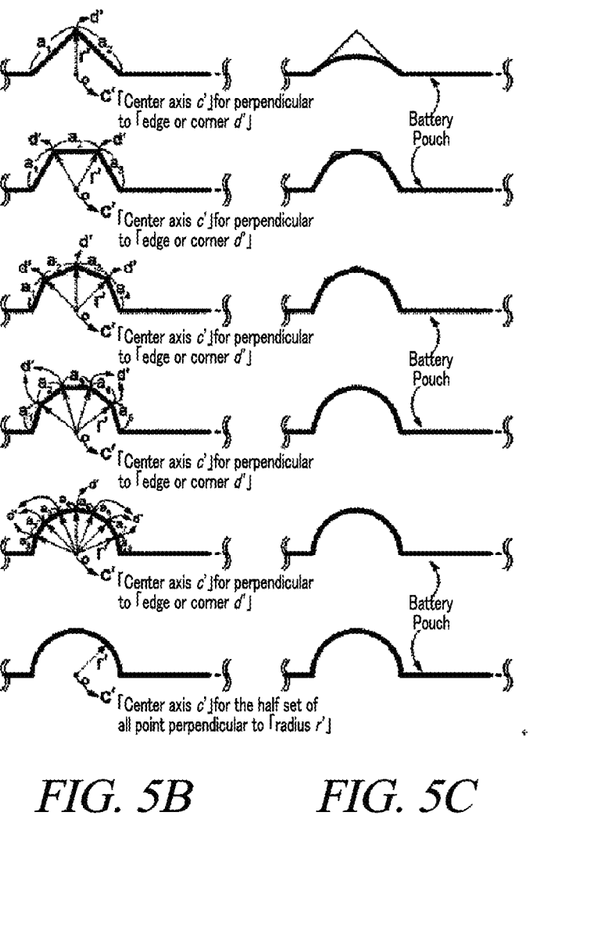

FIGS. 5A-5C are views showing embodiments of the morphology of the pattern of the impressed part 210 and the non-impressed part 220 pattern of the battery pouch according to the present disclosure. In <Side view> of FIG. 5A, the width of the polygonal impressed part 210 is defined as a, the width the non-impressed part 220 is b, the height of the impressed part is h, and an internal angle of the polygonal impressed part on the reference plane is defined as θ". Here, the impressed part 210 may be a triangle when the number of θ" is 1, and may be a quadrangle when the number of θ" is 2. If the number of θ" increases to ∞ (infinity), the shape of the impressed part 210 may be a circle. Also, the impressed part 210 and the non-impressed part 220 may have numerical ranges of 0 mm≤a<20 mm, 0 mm≤b≤5a, 0 mm<h≤2a and 90°≤θ"≤180°.

Referring to <Side view> of FIG. 5B, the perimeter of the impressed part on the reference plane is defined as $\alpha_i$. Here, θ' and $\alpha_i$ may be 90°≤θ'<180° and a<

$$\sum_{i=1}^{\infty} a_i \leq 5a$$

(wherein i is a positive integer). Also, d' which is the edge formed when the impressed part becomes angular, c' which is the interior center axis of a perpendicular to d', and r' which is the distance between d' and c are defined. Here, r' may be 0 mm≤r'<2h. <Side view> of FIG. 5C shows a thin line representing before the edge is rounded off with respect to a certain distance r' and a thick curve representing after the edge is rounded off. FIG. 5C shows an embodiment of the rounding off of the edge d' formed in the impressed part on the reference plane, and the edge rounding may be performed in part or in whole. However, the present disclosure is not limited to the shape and the distance r' shown in the drawing.

Figure 6A:
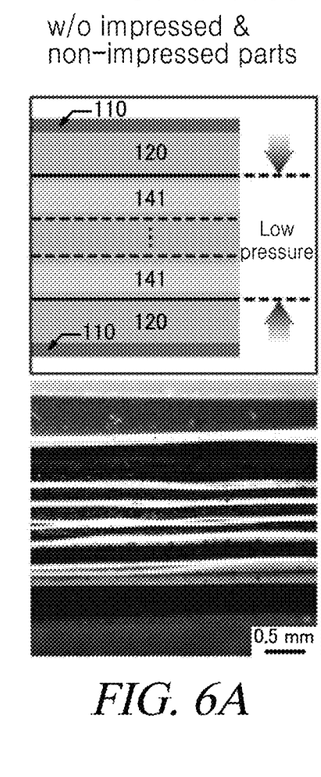
FIGS. 6A-6D provide cross-sectional views showing a state in which the electrode assembly is pressed due to a decrease in the pressure inside the battery during a vacuum sealing process during assembly of the battery. When the same pressure is applied, the degree of pressure applied to the electrode assembly 140 varies depending on combinations of the presence or absence of the impressed part 210 and the non-impressed part 220 of the first member layer 110 with a continuous or discontinuous contact between the second member layer 120 and the electrode assembly 140, and, thus, a gap between the two electrodes 141 may vary.
Figure 6B:
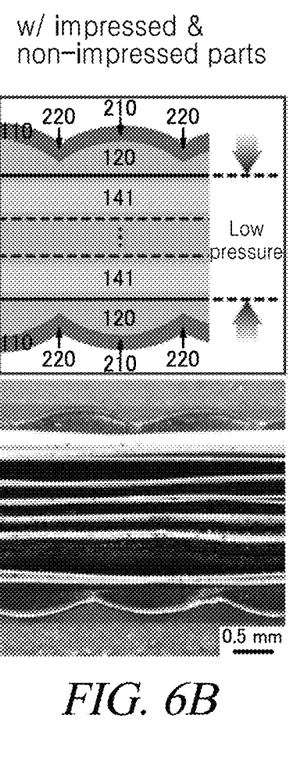
Figure 6C:
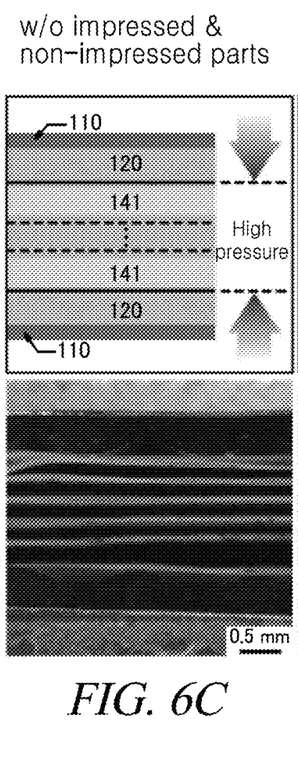
Figure 6D:
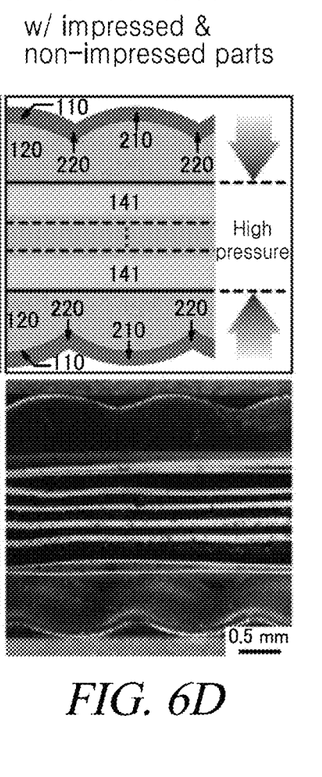

FIGS. 6A-6D provide cross-sectional views showing differences in level of pressure applied to the electrode assembly 140 when battery assemblies are actually manufactured according to the respective four cases illustrated in FIG. 2. When the same vacuum sealing process is performed, a higher level of pressure is applied to the electrode assembly 140 and the electrodes inside the electrode assembly have a shorter distance in the cases where the second member layer 120 are in discontinuous contact with the electrode assembly as shown in FIG. 6C and FIG. 6D than in the cases where the second member layer 120 are in continuous contact with the electrode assembly as shown in FIG. 6A and FIG. 6B.

When the second member layer 120 and the electrode assembly 140 are in discontinuous contact with each other, an empty space is formed between the second member layer 120 and the electrode assembly 140, and while air in the empty space escapes from the space in the vacuum sealing process, the second member layer 120 effectively applies a pressure to the electrode assembly 140. Thus, the differences as shown in FIGS. 6A-6D may be made. However, when there is no empty space between the second member layer 120 and the electrode assembly 140, the amount of air that can escape in the vacuum sealing process is small and a pressure applied to the electrode assembly 140 is low. As a result, it can be confirmed that discontinuous contact plays an important role in effectively transmitting a pressure.

Figure 7:
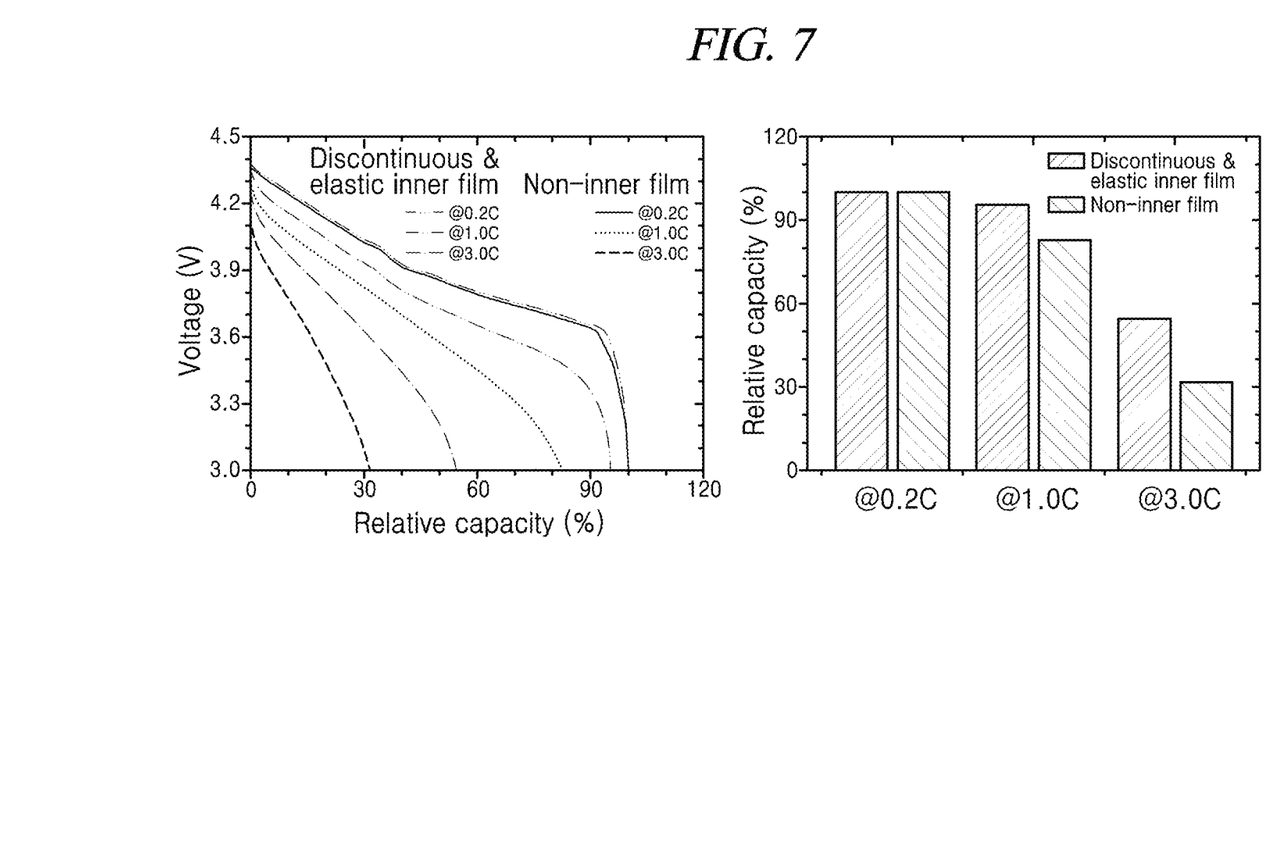
FIG. 7 shows that when a battery pouch that additionally generates an elastic and discontinuous pressure according to the present disclosure is applied to a lithium secondary battery assembly, the power output characteristics are improved compared to when a conventional battery pouch without an elastomer layer is applied.
Figure 8A:
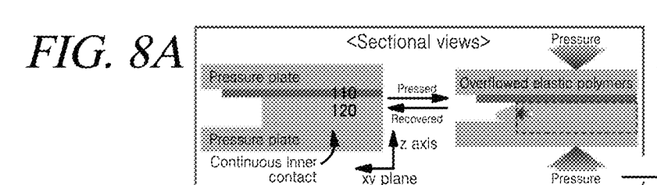
FIGS. 8A-8F show comparative examples in which if the elastomer layer is in continuous contact with the electrode assembly, when a pressure is applied in the z-axis direction during a vacuum sealing process, the elastomer layer overflows in the xy plane direction and the sealing portion is destroyed 131 (FIG. 8A to FIG. 8C), and an embodiment of the present disclosure in which if the elastomer layer is in discontinuous contact with the electrode assembly according to the present disclosure, the sealing portion is stably maintained (FIG. 8D to FIG. 8F).
Figure 8B:
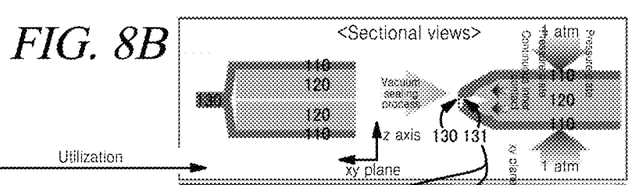
Figure 8C:
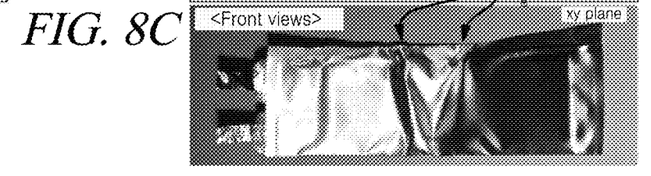
Figure 8D:
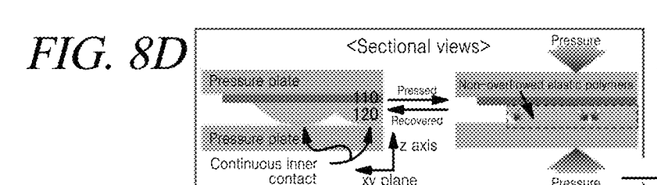
Figure 8E:
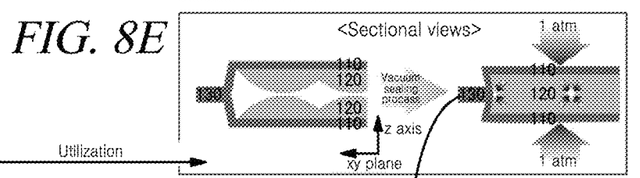
Figure 8F:
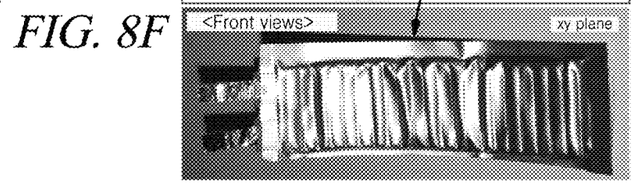

FIG. 7 compares the power output characteristics between a lithium secondary battery employing a battery pouch that additionally generates an elastic and discontinuous pressure according to an embodiment the present disclosure with a lithium secondary battery employing a conventional flat aluminum pouch without an elastomer layer. When the current density was sequentially increased from 20 mA (0.2 C current, 1 C means a current condition in which each of charging and discharging takes 1 hour and is 100 mA in this embodiment) to 100 mA (1 C) and 300 mA (3 C), the lithium secondary battery employing the battery pouch according to the present disclosure maintained the capacity of 95.5% and 54.4% of the initial capacity, whereas the conventional battery employing the flat aluminum pouch without an elastomer layer maintained the capacity of 82.7% and 31.7%. For accurate comparison between the two cases, the same electrode assembly was used.

FIGS. 8A-8F compare the sealing stability between a case where the second member layer 120 is in discontinuous contact with the electrode assembly 140 and a case where the second member layer 120 is flat and in continuous contact with the electrode assembly 140 according to an embodiment of the present disclosure.

When the battery assembly was repeatedly tested for 500-times bends with a bending radius of 2.5 cm, the sealing portion was kept stable in a battery pouch having a discontinuous contact surface between the second member layer and the electrode assembly according to the present disclosure. However, in a battery pouch having a continuous flat contact surface between the second member layer and the electrode assembly as a comparative example, a sealing portion burst phenomenon that the sealing state is destroyed in the middle of the sealing part 130 occurred. If the second member layer 120 is flat, when a pressure is applied in the z-axis direction, the second member layer 120 is pressed against the electrode assembly and the second member layer is pushed out in the xy plane direction, and, thus, the sealing portion may be damaged. Such sealing portion burst phenomenon may cause deterioration of the battery performance or, in more severe cases, lead to inoperability as the inside of the battery assembly is exposed to oxygen and moisture in the atmosphere.

Figure 9:
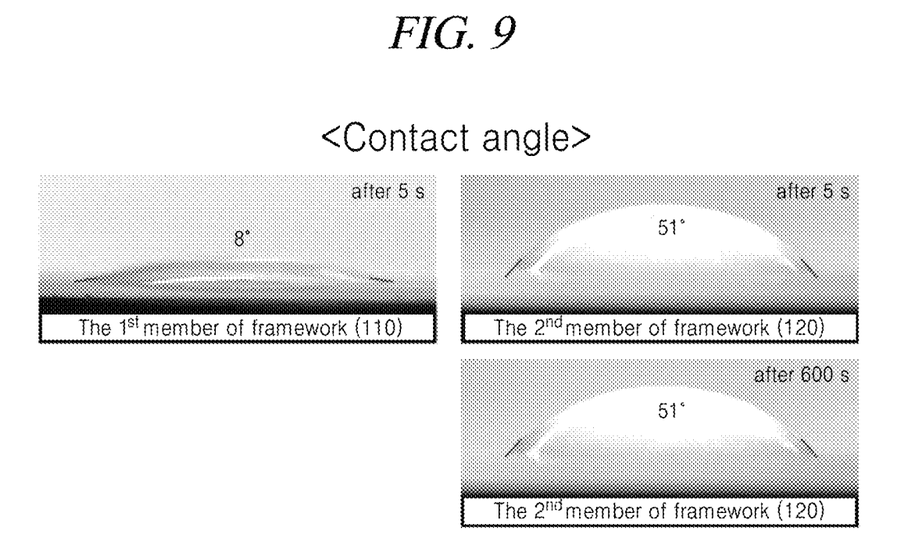
FIG. 9 shows the contact angles of electrolytes measured for each member layer after the elapse of an marked time period from when the electrolytes are dropped on the surfaces of the first member layer 110 and the second member layer 120, respectively.

FIG. 9 shows the contact angles of electrolytes measured for each member layer after the elapse of an marked time period from when the electrolytes are dropped on the surfaces of the first member layer 110 and the second member layer 120, respectively, of the battery pouch according to the present disclosure.

In an embodiment of the present disclosure, a fraction CA-1/CA-2 of a contact angle CA-1 to the electrolyte of the first member layer and a contact angle CA-2 to the electrolyte of the second member layer may be more than 0 and less than 1.

According to the present embodiment, the first member layer is close to the electrolyte and thus may have a small contact angle, and the second member layer is distant from the electrolyte and thus may have a large contact angle. Further, since the second member layer allows very little electrolyte penetration, the initial contact angle can be maintained even after a long time. With these characteristics, even if a pressure is applied from the outside to the inside of the battery assembly and the pressure is transmitted to the electrode assembly 140 so that the electrolyte 143 comes out of the electrode assembly, the electrolyte is continuously pushed back into the electrode assembly due to low affinity between the electrolyte and the second member layer, and, thus, it is possible to effectively suppress a leakage of the electrolyte. In the present embodiment, an electrolyte, 1.2 M $LiPF_6$, EC/DEC=1/1=v/v, was used.

Unlike the above-described case, when CA-1/CA-2 exceeds 1, it is difficult to expect an improvement in suppressing a leakage of the electrolyte by the second member layer.

Figure 10:
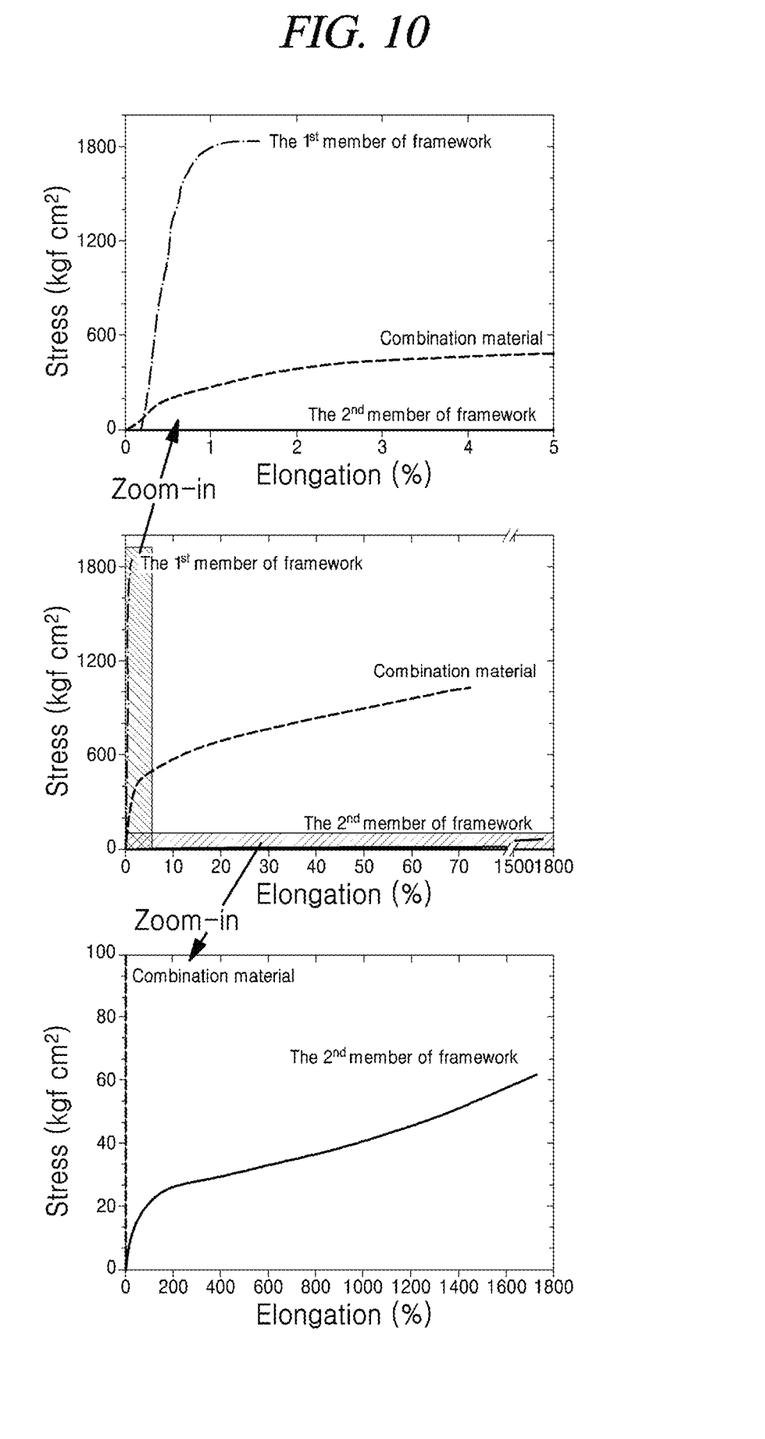
FIG. 10 provides graphs of unit stress versus elongation of the first member layer and the second member layer according to an embodiment of the present disclosure.

FIG. 10 provides graphs of unit stress versus elongation of the first member layer 110 and the second member layer 120 according to an embodiment of the present disclosure. The upper graph of FIG. 10 is an enlarged view of the left side of the central graph, and the lower graph is an enlarged view of the lower side of the central graph. Compared to the second member layer, the first member layer exhibits relatively low elongation and high unit stress. On the contrary, compared to the first member layer, the second member layer exhibits relatively high elongation and low unit stress. A combination material obtained by combining the first member layer with the second member layer has an elongation value between the elongation values of the respective materials and a unit stress value between the unit stress values of the respective materials. Therefore, the combination material can make up for the weaknesses and strengthen the strengths of the first and second member layers.

Therefore, in an embodiment of the present disclosure, when the first member layer 110 is compared to the second member layer 120, the first member layer desirably has relatively high Young's modulus, low water vapor transmission rate, low elongation, and low elastic recovery from elongation. In particular, high elongation and high elastic recovery of the second member layer compared to the first member layer make it possible to improve the mechanical properties of the pouch as well as suppress a leakage of the electrolyte caused by a high contact angle with respect to the electrolyte.

More specifically, when the first member layer 110 is compared to the second member layer 120, the ratio of Young's modulus of the first member layer 110 and the second member layer 120 is desirably from 1,500,000:1 to 1:1, the ratio of water vapor transmission rate is desirably from 1:1 to 1:100, the ratio of elongation is desirably from 1:1 to 1:2,000, and the ratio of elastic recovery is desirably from 1:1 to 1:1,000.

That is, the characteristics of the battery pouch can be greatly improved by applying an excellent resistance to moisture permeability of the first member layer and a high electrolyte contact angle of the second member layer one pouch and applying the above-described numerical ratios so that the second member layer has excellent elastic and flexible properties according to the present disclosure.

INDUSTRIAL APPLICABILITY

The present disclosure can be applied to a flexible secondary battery to improve the power output and safety of the battery.

We claim:

1. A battery pouch that is formed to accommodate an electrode assembly, comprising:
    a first member layer; and
    a second member layer that is located between the first member layer and the electrode assembly, and contains an elastomer and protrudes toward the electrode assembly at a plurality of locations to be brought into discontinuous contact with the electrode assembly,
    wherein the second member layer has spaces open to the electrode assembly between the protruding portions.
2. The battery pouch of claim 1,
    wherein the elastomer includes any one or more selected from the group consisting of unsaturated rubbers that can be cured by sulfur vulcanization, saturated rubbers that cannot be cured by sulfur vulcanization, and thermoplastic elastomers.

3. The battery pouch of claim 1, further comprising:
a plurality of impressed parts and non-impressed parts processed to be repeatedly impressed, and a sealing portion 130,
wherein an area of the second member layer corresponding to the non-impressed parts is in contact with the electrode assembly.

4. The battery pouch of claim 3,
wherein in a repeated pattern of the plurality of impressed parts and non-impressed parts, when the width of the impressed part is defined a, the width of the non-impressed part is defined as b and the height of the impressed part is defined as h, and
based on the height of the non-impressed part which is a reference plane, an internal angle of the impressed part is defined as θ, an external angle of the impressed part is defined as θ', the perimeter of the impressed part is defined as $\alpha_i$ (wherein i is a positive integer), the edge between the impressed part and the non-impressed part is defined as d, the interior center axis of a perpendicular to d is defined as c and the distance between d and c is defined as r,
a is more than 0 mm and equal to or less than 20 mm, b is from 0 mm to 5a, h is more than 0 mm and equal to or less than 2a, θ is more than 0° and equal to or less than 90°, θ' is equal to or more than 90° and less than 180°, the sum $$\sum_{i=1}^{\infty} a_i$$

(wherein i is a positive integer) of the perimeter of the impressed part is more than a and equal to or less than 5a and r is equal to or more than 0 mm and less than 2h.

5. The battery pouch of claim 3,
wherein the in a repeated pattern of the plurality of impressed parts and non-impressed parts, when the width of the impressed part is defined a, the width of the non-impressed part is defined as b, the height of the impressed part is defined as h and the sum of the perimeter of the impressed part is defined as $$\sum_{i=1}^{\infty} a_i$$

(wherein i is a positive integer), and
based on the height of the non-impressed part which is the height of a reference plane, the number of edges formed when the impressed part located on the reference plane becomes angular is defined as N, an internal angle of the edge is defined as θ", the edge is defined as d', the interior center axis of a perpendicular to d" is defined as c' and the distance between d' and c' is defined as r', a is more than 0 mm and equal to or less than 20 mm, b is from 0 mm to 5a, h is more than 0 mm and equal to or less than 2a, the sum $$\sum_{i=1}^{\infty} a_i$$

(wherein i is a positive integer) of the perimeter of the impressed part is more than a and equal to or less than 5a, N is equal to or more than 1, θ" is from 90° to 180° and r' is equal to or more than 0 mm and less than 2h.

6. The battery pouch of claim 1,
wherein when a pressure inside a battery assembly decreases, the second member layer applies a pressure to the electrode assembly and thus reduces the distance between the electrodes of the elect.

7. The battery pouch of claim 1,
wherein a fraction CA-1/CA-2 of a contact angle CA-1 to the electrolyte of the first member layer and a contact angle CA-2 to the electrolyte of the second member layer is more than 0 and less than 1.

8. The battery pouch of claim 1,
wherein when the first member layer is compared to the second member layer, the first member layer has relatively high Young's modulus, low water vapor transmission rate, low elongation, and low elastic recovery from elongation.

9. The battery pouch of claim 8,
wherein the ratio of Young's modulus of the first member layer and the second member layer is from 1,500,000:1 to 1:1, the ratio of water vapor transmission rate is from 1:1 to 1:100, the ratio of elongation is from 1:1 to 1:2,000, and the ratio of elastic recovery is from 1:1 to 1:1,000.

10. The battery pouch of claim 1,
wherein the first member layer has a Young's modulus of from 10,000 kgf cm$^{-2}$ to 3,000,000 kgf cm$^{-2}$, an elongation of from 0.5% to 80%, an elastic recovery from elongation of from 0% to 50%, a contact angle of from 5° to 60° with respect to the electrolyte, and a water vapor transmission rate of from 0 g m$^{-2}$ day$^{-1}$ to 7 g m$^{-2}$ day$^{-1}$ at a thickness of 0.5 mm, and
the second member layer has a Young's modulus of from 2 kgf cm$^{-2}$ to 50,000 kgf cm$^{-2}$, an elongation of from 50% to 2,000%, an elastic recovery from elongation of from 50% to 100%, a contact angle of 40° to 150° with respect to the electrolyte, and a water vapor transmission rate of from 1 g m$^{-2}$ day$^{-1}$ to 17 g m$^{-2}$ day$^{-1}$ at a thickness of 0.5 mm.

11. The battery pouch of claim 6,
wherein the decrease in the pressure inside the battery assembly occurs in a vacuum sealing process during assembly of the battery assembly, and the decrease in the pressure inside the battery assembly causes a decrease in the thickness of the electrode assembly in the range of equal to or more than 0.8 t' and less than 1 t', compared to the thickness t' of the electrode assembly before the vacuum sealing process.

* * * * *